Figure 1:
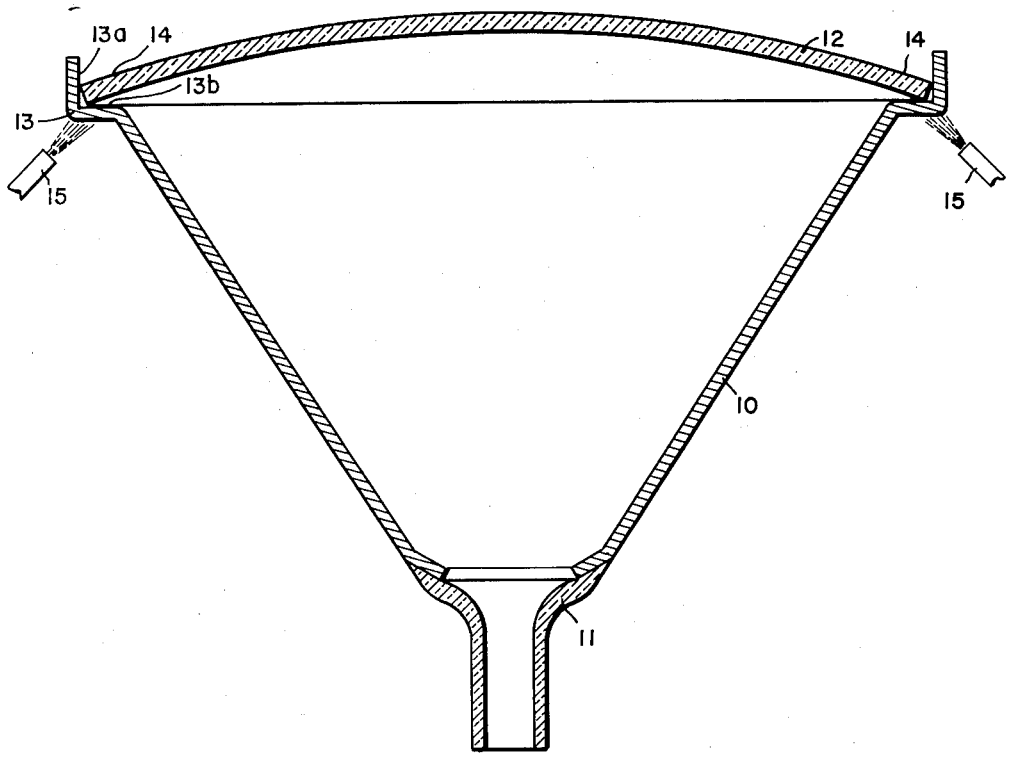

July 26, 1955  D. NIXEN ET AL  2,713,754
MANUFACTURE OF CATHODE-RAY TUBE ENVELOPES
Filed July 23, 1953

DAVID NIXEN
RUSSELL B. SNYDER
INVENTORS.

BY Francis W. Crotty

THEIR ATTORNEY.

United States Patent Office 2,713,754
Patented July 26, 1955

2,713,754

MANUFACTURE OF CATHODE-RAY TUBE ENVELOPES

David Nixon and Russell B. Snyder, Chicago, Ill., assignors to The Rauland Corporation, a corporation of Illinois Application July 23, 1953, Serial No. 369,750

9 Claims. (Cl. 49—81)

This invention pertains to the manufacture of cathode-ray tube envelopes and more particularly to a new and improved method for sealing a glass face-plate to a metal cone section to form such an envelope.

Two general types of envelopes have been employed in the manufacture of cathode-ray tubes intended for use as image-display devices in television receivers, oscilloscopes, and similar apparatus. One type is fabricated completely from glass, whereas the other comprises a metallic cone section, a glass neck portion sealed to the small end of the cone section, and a glass face-plate sealed to the enlarged or open portion of the cone. Metal-cone envelopes present several advantages as compared to glass envelopes; one of the most important of these is the considerably reduced weight of the composite metal-glass structure with respect to an all-glass envelope of the same effective dimensions. However, the continued demand for ever larger screen sizes which is particularly prevalent in television applications presents several difficult problems in providing an adequate pressure-resistant seal between the metal cone section and the glass face-plate. Since cathode-ray tubes are high-vacuum devices, there is an extreme pressure differential between the outside of the tube envelope and the internal area of the finished tube. Consequently, any imperfections or bubbles in the seal between the glass face-plate and the cone may easily lead to an implosion of the envelope, which can cause considerable damage in the surrounding area in addition to destroying the cathode-ray tube completely.

Several different methods have been employed for treating the sealing land or sealing area of the metal cone to provide an improved seal between the cone and the face-plate. In one of these known processes, the land or lip of the cone is spray-coated with a suspension of frit comprising minute glass particles, clay, and a deflocculant such as sodium silicate, in preparation for effecting the glass-to-metal seal. This method of treating the metal cone presents several disadvantages, among which the most important results from the fact that the quality of the metal-to-glass seal is completely dependent upon the application of a thin, even coating by a spray-gun operator. Satisfactory operation in accordance with this method requires the training of highly skilled operators and results in a relatively high percentage of defective seals even under optimum conditions.

Another known method of treating the metal cones to achieve a better seal comprises coating the sealing land of each cone with a solution of sodium dichromate. The sodium dichromate is dissolved in water, a drying agent such as acetone is added, and the solution is painted on the sealing land; the solution dries almost immediately. It is then necessary to bake the cone at a temperature of 450 to 475° F. for a period of approximately ten minutes to decompose the sodium dichromate, after which the cone is cooled. The cone must then be washed to remove the sodium chromate deposited on the surface of the sealing land during the baking, after which the cone is sealed to the glass face-plate. This is a relatively expensive and time-consuming operation in that it requires baking and washing of each of the cones before sealing may be accomplished.

It is an object of the invention, therefore, to provide a new and improved method of sealing a glass face-plate to a metal cone section to form a cathode-ray tube envelope without incurring the above-noted disadvantages of prior art processes.

Another object of the invention is to provide a new and improved method for sealing metallic envelope sections to glass face-plates which inherently avoids any special baking or washing procedures.

It is a corollary object of the invention to provide an economical and expeditious method of sealing a glass face-plate to a metallic cone section to form a cathode-ray tube envelope.

Accordingly, the invention is directed to the manufacture of a cathode-ray tube envelope comprising a metallic cone section having a circumferential sealing land and a glass face-plate having a rim substantially corresponding to that land in dimensions and configuration. In accordance with the invention, the method of sealing the face-plate to the metallic cone section comprises, in sequence, the following steps: A coating of at least one of the compounds from the group consisting of ammonium chromate, ammonium dichromate and chromic anhydride, mixed with a volatilizable liquid vehicle, is applied to the sealing land of the metallic cone section. The face-plate is then positioned on the metallic cone section with the rim of the face-plate engaging the coated sealing land. Thereafter, the sealing land and the face-plate rim are heated to fuse the glass forming the rim and to seal the face-plate to the metallic cone section.

Figure 2:
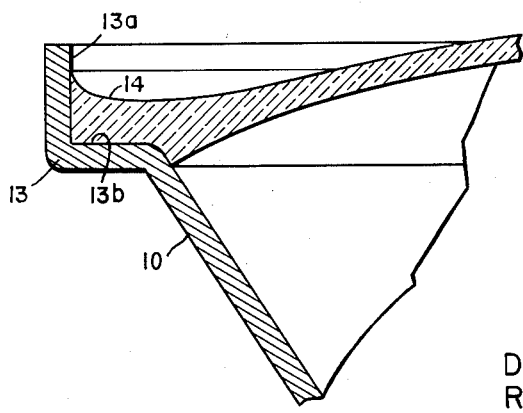

The features of the invention which are believed to be novel are set forth with particularity in the appended claims. The organization and manner of operation of the invention, together with further objects and advantages thereof, may best be understood by reference to the following description taken in conjunction with the accompanying drawing in which:

Figure 1 is a cross sectional view of a partially assembled cathode-ray tube envelope of composite metal and glass construction; and Figure 2 is an enlarged fragmentary view similar to a portion of Figure 1 after completion of the envelope assembly.

The cathode-ray tube envelope illustrated in cross section in Figure 1 comprises a metal cone section 10, a vitreous neck section 11 sealed to the small end of cone section 10, and a glass face-plate 12. Cone section 10 may be of circular, rectangular, or other configuration, depending upon the particular type of cathode-ray tube to be manufactured and the desired configuration for the display area represented by face-plate 12. Face-plate 12 is seated upon a circumferential sealing land 13 which forms a part of metal cone section 10; the edge or rim 14 of the face-plate has the same general circumferential configuration and dimensions as sealing land 13.

Figure 1 shows the envelope components just prior to the stage of envelope manufacture in which face-plate 12 is sealed to cone section 10. Conventionally, neck section 11 is first sealed to the cone section, and the face-plate is subsequently mounted on and sealed to land 13 in a separate step. Insofar as the invention is concerned, this conventional procedure may be followed, or, if desired, face-plate 12 may be bonded to cone section 10 before neck section 11 is sealed thereto, or neck section 11 and face-plate 12 may both be sealed to cone section 10 as a part of the same process step in accordance with the method described and claimed in Patent No. 2,639,555 to Albert L. Buttino and Howard R. Patterson, issued May 26, 1953, and assigned to the same assignee as this application.

Figure 2 is an enlarged illustration of the seal or joint formed between face-plate rim 14 and sealing land 13. The bond between the face-plate and the metal cone section is formed by heating that portion of cone 10 comprising the sealing land and the face-plate rim area so that rim 14 is melted and fused to the sealing land. It is imperative that the uniformity and strength of this seal be as nearly perfect as possible since in subsequent manufacturing steps the cathode-ray tube envelope is completely sealed and evacuated so that there is an extreme pressure differential between the external and internal surfaces of the envelope, and any imperfections in the seal may lead to an implosion in subsequent operation.

In accordance with one embodiment of the invention, a coating of a solution of ammonium dichromate is applied to the surfaces 13a and 13b of sealing land 13 before face-plate 12 is positioned on the sealing land and sealed thereto. Preferably, the solution is also applied to the inner surface of cone 11 in the region immediately adjacent sealing land 13. The solvent for the ammonium dichromate must be volatilizable so that any residual solvent is vaporized and driven off during the heating of rim 14 and land 13 in the subsequent sealing steps of the process. Preferably, the solvent for the ammonium dichromate should be water or a mixture of water and some other liquid vehicle of a more volatile nature such as acetone; however, any other suitable solvent or liquid vehicle, such as alcohol, which does not precipitate the ammonium dichromate or form solid by-products during the heating cycle of the sealing process may be employed. It is preferred that the ammonium dichromate coating be permitted to dry prior to sealing the face plate to cone section 10; however, this step is not essential and the face plate may be positioned on and sealed to sealing land 13 immediately following application of the ammonium dichromate coating.

The chemical reaction of the ammonium dichromate which occurs when heat is applied to sealing land 13 and rim 14 during the sealing process is as follows:

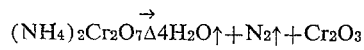

$$(NH_4)_2Cr_2O_7 \xrightarrow{\Delta} 4H_2O\uparrow + N_2\uparrow + Cr_2O_3$$

As indicated in this equation, during the heat treatment of the sealing land the ammonium dichromate decomposes to form water, nitrogen, and chromic oxide. The nitrogen, of course, is in the form of a gas, and escapes into the atmosphere. The continued application of heat vaporizes the water so that it too is driven off, leaving only the chromic oxide, commonly referred to as chrome green, on the surface of sealing land 13 and rim 14. This coating of chrome green effectively acts as a wetting agent and provides for a uniform continuous seal between the melted glass of rim 14 and sealing land 13. The color of the seal is a light green and is very consistent around the entire sealing land circumference; the seal is not adversely affected by variations in the amount of ammonium dichromate applied to the sealing land. The adherence of the fused glass to the metal cone section is superior to that of any of the prior art processes described above; pressure testing of the envelopes indicates that the glass-to-metal seal formed in accordance with the invention withstands pressure differentials between 48 and 52 pounds per square inch, as compared to a range of 40 to 45 pounds per square inch for envelopes fabricated in accordance with the best of the prior-art methods.

A typical sealing process in accordance with the invention, included here merely by way of illustration and in no sense by way of limitation, is as follows:

The coating solution is formed by dissolving 50 grams of ammonium dichromate in 300 milliliters of water. Two-hundred and fifty milliliters of acetone are then added to form the final coating solution; the acetone is employed primarily because it has a higher evaporation rate than the water. The ammonium dichromate solution is painted on sealing land surfaces 13a and 13b with a brush, and is permitted to dry. Drying usually takes five to ten minutes at normal ambient or room temperature (70–80° F.); it should be noted that no baking or cleaning of the coating is required or even desirable. Metal cone 10 is then placed on a suitable sealing machine and face plate 12 is positioned on the cone section with rim 14 engaging the coated sealing land 13. Rim 14 and the sealing land are then heated in any suitable manner, as by playing intense flames from an array of gas burners 15 on the exterior surface of the metal cone where it joins the sealing land; as the rim of the face-plate softens, it first settles into full sealing contact with the sealing land under the influence of gravity, and is subsequently fused to the metal sealing land to complete the seal.

In another and equally efficacious embodiment of the invention, a solution of ammonium chromate is employed instead of the ammonium dichromate coating. In all other respects, the procedure may be the same as that described above for the ammonium dichromate. The reaction occurring during heating of the sealing land, where ammonium chromate is employed, is as follows:

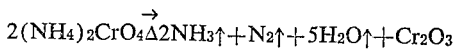

$$2(NH_4)_2CrO_4 \xrightarrow{\Delta} 2NH_3\uparrow + N_2\uparrow + 5H_2O\uparrow + Cr_2O_3$$

As indicated by this equation, the decomposition products of the ammonium chromate are ammonia, nitrogen, and water. Since both the ammonia and nitrogen are gases, they immediately escape from the sealing land area; similarly, at the sealing temperature, the water formed is in a gaseous state and is driven off, leaving only a coating of chromic oxide or chrome green on the surface of the sealing land. As before, no solid or non-volatilizable by-products or contaminants are formed to interfere with the consistency and strength of the glass-to-metal seal.

An additional embodiment of the invention is generally similar to the two sealing processes described above except that a solution of chromic anhydride is employed as the wetting or bonding agent. During the heating of sealing land 13 and rim 14, the chromic anhydride solution (chromic acid) applied to the sealing land reacts as follows:

$$H_2CrO_4 \xrightarrow{\Delta} H_2O\uparrow + Cr_2O_3$$

As shown by this equation, the water formed by the decomposition of the chromic acid escapes as a gas so that only a coating of chrome green remains on sealing land surfaces 13a and 13b. As in the previously-described embodiments, it is necessary that the solvent be volatilizable at the sealing temperature so that no bubbles or other imperfections are present in the glass-to-metal seal; water, or a mixture of water and a more highly volatile liquid are preferred.

In any of the above-described embodiments, it is possible to utilize a liquid vehicle or carrier which is not a true solvent for the ammonium chromate or dichromate. A slurry, suspension, or mixture of the active coating material is satisfactory providing it is sufficiently homogeneous to permit ready application of a continuous coating to the sealing land. As before, however, the liquid vehicle must be volatilizable so that it may be vaporized and driven off during the heating cycle of the sealing process.

While particular embodiments of the present invention have been described, it is apparent that changes and modifications may be made without departing from the invention in its broader aspects. The aim of the appended claims, therefore, is to cover all such changes and modifications as fall within the true spirit and scope of the invention.

We claim:
1. In the manufacture of a cathode-ray tube envelope comprising a metallic cone section having a circumferential sealing land and a glass face-plate having a rim substantially corresponding to said land in dimensions and configuration, the method of sealing said face-plate to said metallic cone section comprising the following steps in sequence: applying to said sealing land a coating of at least one of the compounds from the group consisting of ammonium chromate, ammonium dichromate and chromic anhydride mixed with a volatilizable liquid vehicle; positioning said face plate on said metallic cone section with said face-plate rim engaging said coated sealing land of said cone section; and heating said cone section sealing land and said face-plate rim to a temperature above the fusion point of said glass faceplate to contemporaneously decompose said coating to an oxide of chromium with fully volatilizable by-products and fuse the glass of said rim and seal said face-plate to said metallic cone section.

2. In the manufacture of a cathode-ray tube envelope comprising a metallic cone section having a circumferential sealing land and a glass face-plate having a rim substantially corresponding to said land in dimensions and configuration, the method of sealing said face-plate to said metallic cone section comprising the following steps in sequence: applying to said sealing land a coating of a solution in a volatilizable liquid solvent of at least one of the compounds from the group consisting of ammonium chromate, ammonium dichromate and chromic anhydride; positioning said face plate on said metallic cone section with said face-plate rim engaging said coated sealing land of said cone section; and heating said cone section sealing land and said face-plate rim to a temperature above the fusion point of said glass faceplate to contemporaneously decompose said coating to an oxide of chromium with fully volatilizable by-products and fuse the glass of said rim and seal said face-plate to said metallic cone section.

3. In the manufacture of a cathode-ray tube envelope comprising a metallic cone section having a circumferential sealing land and a glass face-plate having a rim substantially corresponding to said land in dimensions and configuration, the method of sealing said face-plate to said metallic cone section comprising the following steps in sequence: applying to said sealing land a coating of an aqueous solution of at least one of the compounds from the group consisting of ammonium chromate, ammonium dichromate and chromic anhydride; positioning said face plate on said metallic cone section with said face-plate rim engaging said coated sealing land of said cone section; and heating said cone section sealing land and said face-plate rim to a temperature above the fusion point of glass to contemporaneously decompose said coating to chromic oxide with fully volatilizable by-products and fuse the glass of said rim and seal said face-plate to said metallic cone section.

4. In the manufacture of a cathode-ray tube envelope comprising a metallic cone section having a circumferential sealing land and a glass face-plate having a rim substantially corresponding to said land in dimensions and configuration, the method of sealing said face plate to said metallic cone section comprising the following steps in sequence: applying to said sealing land a coating of an aqueous solution of at least one of the compounds from the group consisting of ammonium chromate, ammonium dichromate and chromic anhydride; evaporating said solvent to dry said coating; positioning said face plate on said metallic cone section with said face-plate rim engaging said coated sealing land of said cone section; and heating said cone section sealing land and said face-plate rim to a temperature above the fusion point of glass to contemporaneously decompose said coating to chromic oxide with fully volatilizable by-products and fuse the glass of said rim and seal said face-plate to said metallic cone section.

5. In the manufacture of a cathode-ray tube envelope comprising a metallic cone section having a circumferential sealing land and a glass face-plate having a rim substantially corresponding to said land in dimensions and configuration, the method of sealing said face-plate to said metallic cone section comprising the following steps in sequence: applying to said sealing land a coating of a solution of ammonium dichromate in a volatilizable liquid solvent; positioning said face-plate on said metallic cone section with said face-plate rim engaging said coated sealing land of said cone section; and heating said cone section sealing land and said face-plate rim to a temperature above the fusion point of glass to contemporaneously decompose said ammonium dichromate coating to chromic oxide, nitrogen and water vapor and fuse the glass of said rim and seal said face-plate to said metallic cone section.

6. In the manufacture of a cathode-ray tube envelope comprising a metallic cone section having a circumferential sealing land and a glass face plate having a rim substantially corresponding to said land in dimensions and configuration, the method of sealing said face plate to said metallic cone section comprising the following steps in sequence: applying to said sealing land a coating of a solution of ammonium dichromate in a solvent comprising a mixture of water and acetone; drying said coating at approximately ambient temperature; positioning said face plate on said metallic cone section with said face-plate rim engaging said coated sealing land of said cone section; and heating said cone section sealing land and said face-plate rim to a temperature above the fusion point of glass to contemporaneously decompose said ammonium dichromate coating to chromic oxide, nitrogen and water vapor and fuse the glass of said rim and seal said face-plate to said metallic cone section.

7. In the manufacture of a cathode-ray tube envelope comprising a metallic cone section having a circumferential sealing land and a glass face-plate having a rim substantially corresponding to said land in dimensions and configuration, the method of sealing said face-plate to said metallic cone section comprising the following steps in sequence: applying to said sealing land a coating of a solution of ammonium chromate in a volatilizable liquid solvent; positioning said face plate on said metallic cone section with said face-plate rim engaging said coated sealing land of said cone section; and heating said cone section sealing land and said face-plate rim to a temperature above the fusion point of glass to contemporaneously decompose said ammonium chromate coating to chromic oxide, ammonia, nitrogen, water vapor and fuse the glass of said rim and seal said face-plate to said metallic cone section.

8. In the manufacture of a cathode-ray tube envelope comprising a metallic cone section having a circumferential sealing land and a glass face-plate having a rim substantially corresponding to said land in dimensions and configuration, the method of sealing said face plate to said metallic cone section comprising the following steps in sequence: applying to said sealing land a coating of a solution of ammonium chromate in a solvent comprising a mixture of water and acetone; drying said coating at approximately ambient temperature; positioning said face plate on said metallic cone section with said face-plate rim engaging said coated sealing land of said cone section; and heating said cone section sealing land and said face-plate rim to a temperature above the fusion point of glass to contemporaneously decompose said ammonium chromate coating to chromic oxide, ammonia, nitrogen, water vapor and fuse the glass of said rim and seal said face-plate to said metallic cone section.

9. In the manufacture of a cathode-ray tube envelope comprising a metallic cone section having a circumferential sealing land and a glass face-plate having a rim substantially corresponding to said land in dimensions and configuration, the method of sealing said face-plate to said metallic cone section comprising the following steps in sequence: applying to said sealing land a coating of a solution of chromic anhydride in a volatilizable liquid solvent; positioning said face-plate on said metallic cone section with said face-plate rim engaging said coated sealing land of said cone section; and heating said cone section sealing land and said face-plate rim to a temperature above the fusion point of glass to contemporaneously decompose said chromic anhydride coating to chromic oxide and water vapor and fuse the glass of said rim and seal said face-plate to said metallic cone section.

References Cited in the file of this patent

UNITED STATES PATENTS

| | | |
|---|---|---|
| 2,296,307 | Power | Sept. 22, 1942 |
| 2,639,555 | Buttino et al. | May 26, 1953 |

FOREIGN PATENTS

| | | |
|---|---|---|
| 23,404 | Great Britain | A. D. 1910 |

OTHER REFERENCES

"Stainless Steel for Television," by Arnold Rose, RCA Publication No. ST–563. Reprinted from "Metal Progress," June 1950, pages 761–764.